May 1, 1934.　　　　　A. E. GRANT　　　　　1,957,042
NUT
Filed March 15, 1932　　　2 Sheets-Sheet 1
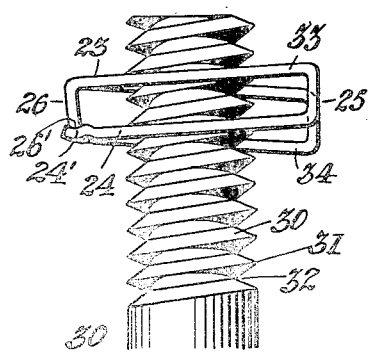
Fig. 1.
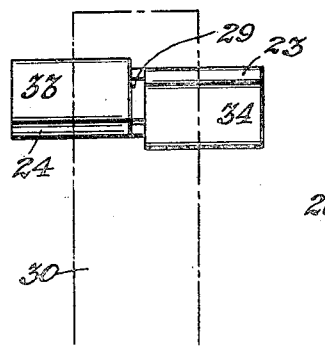
Fig. 2.
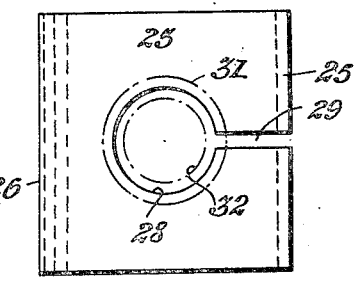
Fig. 3.
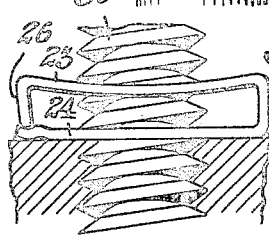
Fig. 1a.
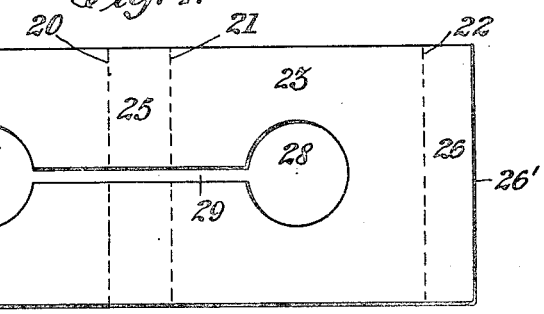
Fig. 4.
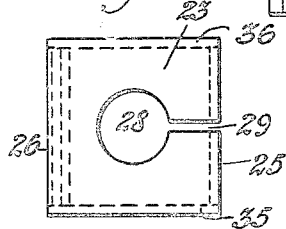
Fig. 5.
Fig. 6.
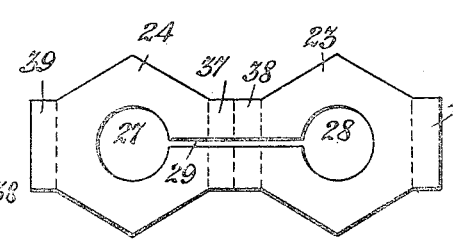
Fig. 7.
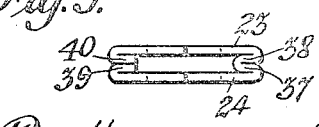
Fig. 8.
Fig. 10.
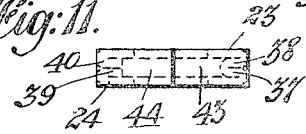
Fig. 9.
Fig. 11.
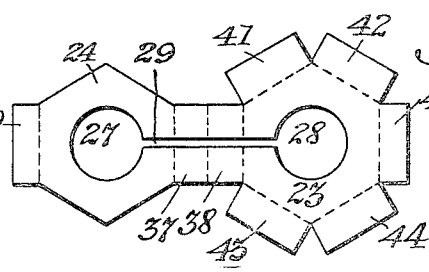
Fig. 12.
INVENTOR
ALBERT E. GRANT
BY Ashley & Ashley
ATTORNEYS May 1, 1934.  A. E. GRANT  1,957,042
NUT
Filed March 15, 1932    2 Sheets-Sheet 2
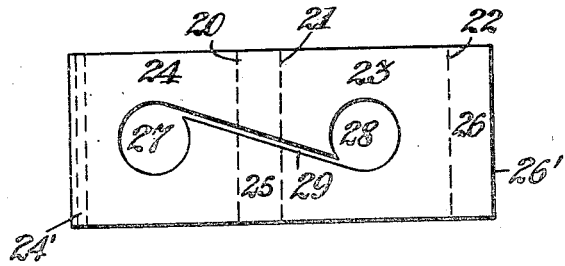
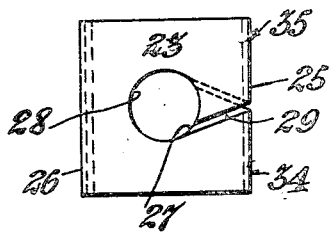   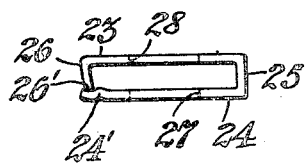
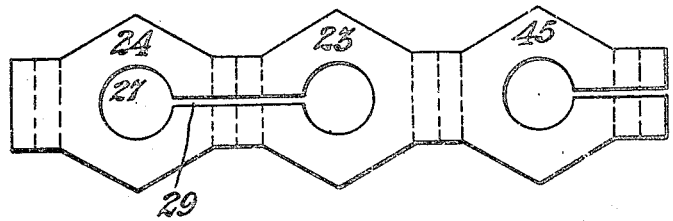
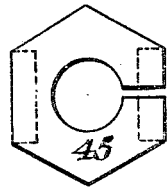   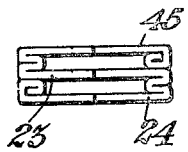
INVENTOR
ALBERT E. GRANT
BY
Ashley + Ashley
ATTORNEYS Patented May 1, 1934

1,957,042

UNITED STATES PATENT OFFICE 1,957,042

NUT

Albert E. Grant, New York, N. Y.

Application March 15, 1932, Serial No. 598,935

3 Claims. (Cl. 151—21)

My invention relates to closed pairs of elements capable of relative helical movement and more particularly to the open pieces of pairs of this character.

In another aspect my invention may be said to relate to nuts of the variety that are commonly applied to the spiral threads of bolts or screws, and will hereinafter be so referred to since the open piece here to be disclosed is adapted for similar service.

The object of my invention is to provide a nut of sheet metal which will be efficient, inexpensive and light in weight, adapted to be produced in quantities on standard automatic stamping machines by the use of simple progressive dies.

A further and principal object is to provide a nut which will automatically lock to a spirally threaded bolt or screw when drawn up against a shoulder, or other abutment, without the application of a lock washer or other such device.

Referring to the drawings which form a part of this specification:

Fig. 1 is an elevation of a square nut embodying my invention mounted on a threaded bolt and in engagement with the threads thereof.

Fig. 1—a is an elevation showing the nut drawn up in locked position on the bolt in abutment with a shoulder.

Fig. 2 is a right side view of the nut as shown in Fig. 1.

Fig. 3 is a plan view of the nut.

Fig. 4 is a plan view of the sheet metal blank from which the nut is formed.

Fig. 5 is a plan view of a square nut embodying my invention in a modified form.

Fig. 6 is a front elevation of the nut shown in Fig. 5, and

Fig. 7 is a plan view of the blank from which it is formed.

Fig. 8 is a plan view of a hexagonal nut embodying my invention in a further modified form, and Fig. 9 is a front elevation thereof.

Fig. 10 is a plan view of the blank from which this hexagonal nut is formed.

Fig. 11 is an elevation of a hexagonal nut embodying my invention in another form, and Fig. 12 is a plan view of the blank from which it is formed.

Fig. 13 is a plan view of a blank similar to Fig. 4 but showing the slotted area angularly disposed between the perforations.

Fig. 14 is a plan view of a nut formed from the blank shown in Fig. 13, and

Fig. 15 is a side elevation thereof.

Fig. 16 is a plan view of a blank employed to form a nut having more than two portions adapted to engage bolt threads.

Fig. 17 is a plan view of a nut formed from the blank shown in Fig. 16, and

Fig. 18 is a side elevation thereof.

The blank shown in Fig. 4 is a rectangular strip of thin resilient metal adapted to be bent crosswise where indicated by the dotted lines 20, 21 and 22 to form a quadrangle having a top portion 23, a bottom portion 24 and side portions 25 and 26, respectively. The top and bottom portions are each centrally perforated, as shown at 27 and 28, over an area approximating the root diameter of the threaded bolt on which the nut is designed for use, and the arrangement is such that the perforated areas are in vertical alignment when the strip is bent into quadrangular form as illustrated by Fig. 3 in which the concentric circles 31 and 32, shown in dotted lines, indicate the outer and root diameters, respectively, of the bolt 30.

The strip is also slotted between the more closely adjacent margins of the perforations 27 and 28 as illustrated at 29 so that when the blank is bent into form, one side of the nut is divided into two half portions or lobes 33 and 34, respectively, capable of appreciable movement, one relative to the other, by reason of the resilience of the metal.

It will be noted that the portion 26 is narrower in width than the portion 25 by the thickness of the metal and that the edge 26' abuts the portion 24 when the nut is formed into shape and is pitched in slightly to engage a corrugation 24' formed adjacent the edge of the bottom portion 24. (See Fig. 1.)

I have found that best results are obtained where the thickness of the metal corresponds to approximately one-half the pitch of the single threaded screw on which it is to be employed and that the distance between the top and bottom portions of the nut must be predetermined such that each portion will engage a thread of the bolt.

The nut is applied to the bolt in the usual manner, the margins of the perforations 27 and 28 serving the purpose of threads in engagement with the threads of the bolt.

As the relative turning movement is commenced, the material at the margins of the perforations is forced to conform to the spiral pitch of the bolt threads, thus flexing the resilient material to relatively move the lobe portions 33 and 34 of the nut, as illustrated in Figs. 1 and 2. Since this flexing occurs against the yielding resistance of the spring metal, the nut is caused to bind slightly on the bolt threads and a close working fit is accomplished which has been found highly desirable.

When the nut is drawn up tightly against an abutment, such as the shoulder shown in Fig. 1—a, this binding action is greatly increased, the top and bottom sections being drawn together to exert a considerable binding pressure of the margins of the perforations against the threads of the bolt. In this manner the nut is automatically locked to the bolt so tightly that it will not back off from any ordinary accidental causes. However, the nut may be removed with a suitable wrench and the spring metal of which it is made then resumes its original form so that the nut may be reapplied and relocked a large and indeterminate number of times.

The modification illustrated in Figs. 5, 6 and 7 is in all respects the same as that above described except that the top portion of the blank is formed with side sections 35 and 36, respectively, which are bent down to provide a better gripping surface in contact with the wrench used to revolve it. Unlike the edge 26', the edges of these sections 35 and 36 do not abut the bottom section 24 but overextend it.

The modification illustrated by the hexagonal form in Figs. 8, 9 and 10 is more particularly suited for very small nuts to be made of very light gauge metal. Here, as in the other forms, the metal is of a thickness corresponding to approximately one-half the pitch of the thread but the top and bottom portions are spaced apart by two thicknesses of the metal to provide adequate strength when the lighter metal is used, the portions 37 and 38 and end portions 39 and 40 being inwardly bent as illustrated in Fig. 9.

Figures 11 and 12 illustrate the same hexagonal nut described above provided with side sections 41 and 44, similar to the side sections 35 and 36 in Fig. 7, and designed to serve the same purpose.

If, in using very light material for making the devices, as when a nut is to be made for a thread of extremely small pitch, it is desired to stiffen the resilient action, the slot 29 may be angularly disposed as illustrated in Figs. 13, 14 and 15. Here the slot 29 extends from the holes in the top and bottom portions at dissimilar angles with the result that relatively greater effort is necessary to relatively move the lobe portions 33 and 34 and a proportionately greater binding friction on the bolt threads is secured. It will also be noted that the nut constructed in this manner will surround the full circumference of the bolt.

Another modification of the construction adapted where light gauge metal is to be employed for fine bolt threads is shown in Figs. 16, 17 and 18. The blank is formed up as in Fig. 18 to provide a top portion 45, an intermediate portion 23 and a bottom portion 24 each spaced apart from the other and having aligned perforations and slots so arranged that the material adjacent the margins of each perforation will be deflected to serve as a thread in engagement with the threads of the bolt.

Having thus described my invention, I claim:—

1. A nut comprising a strip of resilient sheet metal bent to provide a plurality of flat portions spaced apart, and side portions between said flat portions arranged to hold them spaced apart a fixed distance adjacent their edges on opposite sides of the nut, each of said flat portions having an opening therethru in alignment with each other to receive a threaded bolt, and a slot formed in said strip in communication with each of said openings and thru one side of the nut to permit resilient distortion of the nut when the margins of said openings are deflected into engagement with a bolt thread.

2. A nut comprising a strip of resilient sheet metal bent to provide a plurality of flat portions spaced apart, and side portions between said flat portions folded inwardly and arranged to hold them spaced apart a fixed distance adjacent their edges on opposite sides of the nut, each of said flat portions having an opening therethru in alignment with each other to receive a threaded bolt, and a slot formed in said strip in communication with each of said openings and thru one side of the nut.

3. A nut comprising a strip of resilient sheet metal bent to provide a plurality of flat portions spaced apart, and side portions between said flat portions arranged to hold them spaced apart a fixed distance adjacent their edges on opposite sides of the nut, each of said flat portions having an opening therethru in alignment with each other to receive a threaded bolt, and an angularly extending longitudinal slot formed in said strip in communication with each of said openings and dividing one side of the nut to permit resilient distortion of the nut when the margins of said openings are deflected into engagement with a bolt thread.

ALBERT E. GRANT.